United States Patent [19]
Diggs

[11] 3,973,732
[45] Aug. 10, 1976

[54] QUICK-CONNECT FITTINGS FOR A TRICKLE TYPE IRRIGATION SYSTEM

[76] Inventor: Richard E. Diggs, 210 N. River St., P.O. Box 776, Carthage, Mo. 64836

[22] Filed: Aug. 16, 1974

[21] Appl. No.: 498,181

Related U.S. Application Data

[62] Division of Ser. No. 213,927, Dec. 30, 1971, Pat. No. 3,833,019.

[52] U.S. Cl. .............................. 239/271; 239/542; 239/547; 285/3; 285/5; 285/158; 285/200; 285/DIG. 22
[51] Int. Cl.² ............................................ F16L 41/04
[58] Field of Search ............. 285/5, 197, 198, 199, 285/200, 162, DIG. 22, 423, 3, 158; 137/318; 239/547, 542, 271

[56] References Cited
UNITED STATES PATENTS

| | | | |
|---|---|---|---|
| 1,036,674 | 8/1912 | Meurling............................ | 285/197 X |
| 1,520,048 | 12/1924 | Baird.................................. | 239/547 X |
| 1,888,404 | 11/1932 | Yahnka............................... | 239/547 X |
| 1,946,237 | 2/1934 | Robertson.......................... | 285/197 |
| 2,180,960 | 11/1939 | Kennedy............................ | 285/DIG. 22 |
| 2,650,132 | 8/1953 | Reinecke........................... | 239/542 |
| 3,046,698 | 7/1962 | Breen et al. ...................... | 285/259 X |
| 3,091,401 | 5/1963 | Hruby................................ | 239/547 X |
| 3,269,664 | 8/1966 | Lamb et al........................ | 137/318 X |
| 3,292,378 | 12/1966 | Rosenthal et al. ............... | 239/547 X |
| 3,547,355 | 12/1970 | Salazar.............................. | 239/547 |
| 3,620,023 | 11/1971 | Schmid.............................. | 239/547 X |
| 3,730,209 | 5/1973 | Binard et al. ..................... | 285/197 X |

FOREIGN PATENTS OR APPLICATIONS

| | | | |
|---|---|---|---|
| 764,401 | 3/1934 | France............................... | 285/197 |
| 2,014,082 | 10/1971 | Germany........................... | 285/197 |
| 481,340 | 12/1969 | Switzerland...................... | 285/DIG. 22 |
| 960,123 | 6/1964 | United Kingdom.............. | 137/318 |

*Primary Examiner*—Thomas F. Callaghan
*Attorney, Agent, or Firm*—Shoemaker and Mattare, Ltd.

[57] ABSTRACT

Quick-connect fittings for a trickle-type irrigation system wherein the fittings include gripping means thereon for quickly and easily joining the fittings to plastic pipes and the like without requiring the use of tools. In one form of the invention, the fitting has piercing means thereon for penetrating the wall of a plastic pipe to make a secure and leak-tight connection thereto without requiring the use of tools; and in another form of the invention, adjustable resilient orifice means is in the fitting.

1 Claim, 9 Drawing Figures

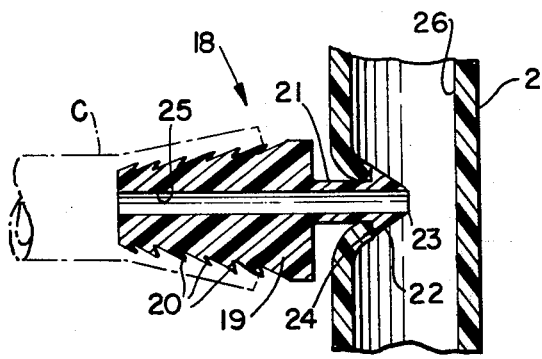
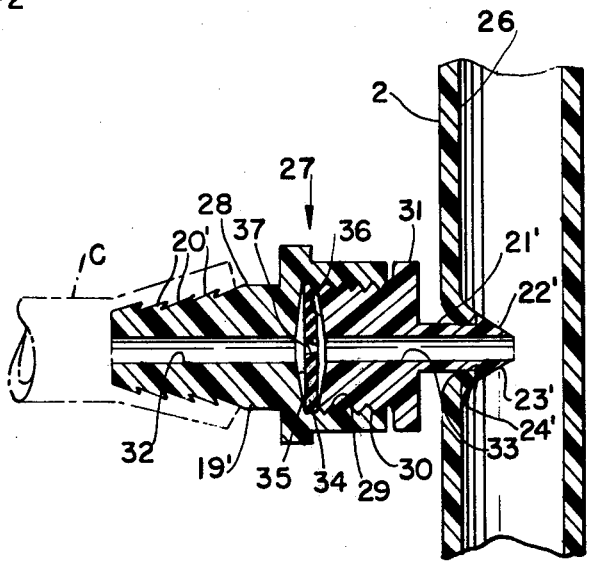
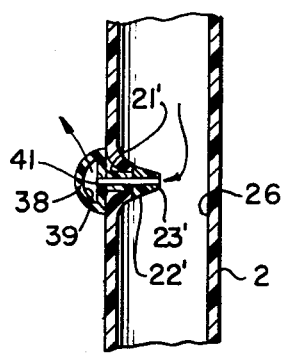
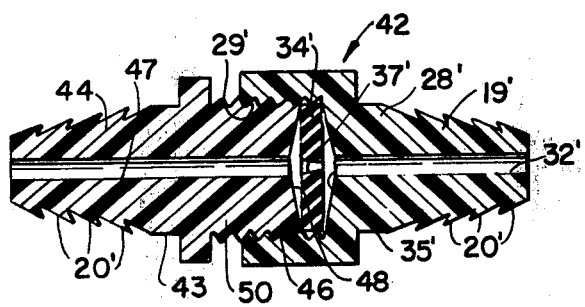
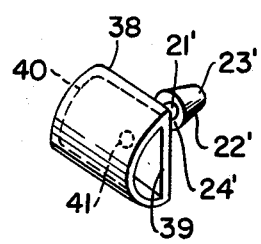
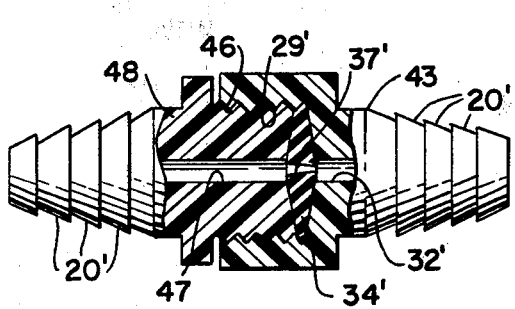

QUICK-CONNECT FITTINGS FOR A TRICKLE TYPE IRRIGATION SYSTEM

This is a division, of application Ser. No. 213,927, filed Dec. 30, 1971 now U.S. Pat. No. 3,833,019.

Background of the Invention

This invention relates to a trickle type irrigation system and to fittings for use therein wherein irrigating water is caused to trickle or drip in a controlled root zone area to be irrigated at a very low rate of flow and thus to conserve irrigating water and to eliminate mass flooding of an irrigated area and the consequent damage to irrigated crops and the like.

It is becoming increasingly more important for larger and higher quality yields of crops to be achieved in order for farming to be economically productive. Moreover, there is a severe shortage of personnel available to irrigate crops and the cost of labor for irrigation is extremely high. Further, the shortage of water available for irrigation has resulted in spiralling costs of irrigation water and new methods of irrigation have become necessary. Recent developments have included low cost plastic piping materials and devices to apply irrigating water to a controlled root zone area to be irrigated at a very low flow rate in order to conserve irrigating water. Such devices have been devised for use both above ground and below ground, as exemplified by my U.S. Pat. No. 3,630,236.

The present invention provides means which significantly simplify and reduce the cost of the physical components and the cost of installation and labor of trickle type irrigation systems.

With the present invention, no tools are needed in order to connect together the fittings and pipes and the like in an irrigation system, and the connections between main lines and branch lines and drip type fittings and the like can be accomplished quickly and easily with a resultant substantial savings in labor and cost.

According to one aspect of the invention, a fitting is provided for joining branch lines to a main line and comprises a fitting having one or more tapered and externally serrated nipples for the quick and easy connection thereto of plastic branch lines, which fitting is both leakproof and secure.

According to another aspect of the invention, a piercing fitting is provided which has piercing means on one end thereof adapted to penetrate the wall of a plastic pipe or the like to quickly and securely join the fitting to the plastic pipe in a leakproof manner. The fitting also has a tapered, externally serrated surface on the other end thereof for the quick connection thereto of a plastic pipe.

Still another form of the invention includes a pair of threadably joined together body members, one of which has a piercing means on one end thereof for piercing the wall of a plastic pipe and wherein the other body member has a tapered, serrated surface thereon for the quick and easy connection thereto of a plastic pipe. A resilient compressible orifice member is clamped between the two body members and the body members have concave, tapered adjacent surfaces for engaging the orifice member to press it radially inwardly to restrict the size of the orifices therethrough.

Still another form of the invention comprises a pair of threadably engaged body members, each of which has a tapered serrated surface thereon for the quick connection thereto of a plastic pipe, and between which is clamped a resilient compressible orifice member as above, and from which an optional plain or perforated tube or the like can be extended along a row or around a tree to further distribute the water in a selected root zone area.

Still another form of the invention is a simple calibrated orifice fitting with either an open or shrouded discharge with a piercing means on one end thereof for quick and easy connection to a plastic water supply pipe.

Objects of the Invention

It is an object of this invention to provide fittings for a trickle type irrigation system, wherein plastic pipes and the like may be quickly and easily joined together in a secure and leakproof manner without the use of tools or the like, thus resulting in a substantial savings in labor and cost.

Another object of this invention is to provide a fitting for an irrigation system wherein the fitting has a piercing means on one end thereof for penetrating the side of a plastic pipe to automatically and sealingly connect the fitting to the plastic pipe, and wherein the fitting has means on the other end thereof for quickly and easily joining a second plastic pipe thereto in a secure and leakproof manner.

A further object of this invention is to provide a fitting for a trickle type irrigation system, wherein a pair of body members are threadably joined together and clamp a resilient compressible orifice member therebetween, said body members having tapered surfaces therein adapted to engage the compressible orifice member and compress it radially inwardly to reduce the size of the orifice therethrough.

Yet another object of this invention is to provide a fitting for a trickle type irrigation system for joining one type of plastic pipe or the like to another type of plastic pipe or the like, or for joining a plastic pipe to a metal pipe or fitting, such as a reducing T or reducing cross and the like, or to provide an outlet from large main lines into smaller branch lines or the like, wherein no tools are required to use the fitting.

A still further object is to provide an elongate tube which can be extended along a row of crops or around a tree or the like for distributing water in a selected root zone area.

Brief Description of the Drawings

FIG. 4 is a sectional view of a second type of fitting according to the present invention illustrating the manner in which the fitting pierces the wall of a plastic pipe or the like to join the plastic pipe to a second plastic pipe in a secure and leakproof manner.

FIG. 5 is a view in section of a third type of fitting comprising a pair of threadably adjustably assembled body members having a piercing means thereon for joining the fitting to a plastic pipe and wherein a compressible resilient orifice member is clamped between the body members.

FIG. 6 is a sectional view of a fourth type of fitting comprising a simple, calibrated orifice fitting with piercing means thereon for connection to a plastic water supply pipe.

FIG. 7 is a perspective view of the fitting shown in FIG. 6.

FIG. 8 is a view in section of a fifth type of fitting wherein a pair of body members are threadably adjustably assembled and a compressible resilient orifice member is clamped therebetween, said body members having tapered, serrated surfaces thereon for assembling plastic pipes thereto.

FIG. 9 is a view similar to FIG. 8, showing the body members threaded together and compressing the orifice member radially inwardly to reduce the size of the orifice therethrough.

Detailed Description of the Invention

Figure 1:
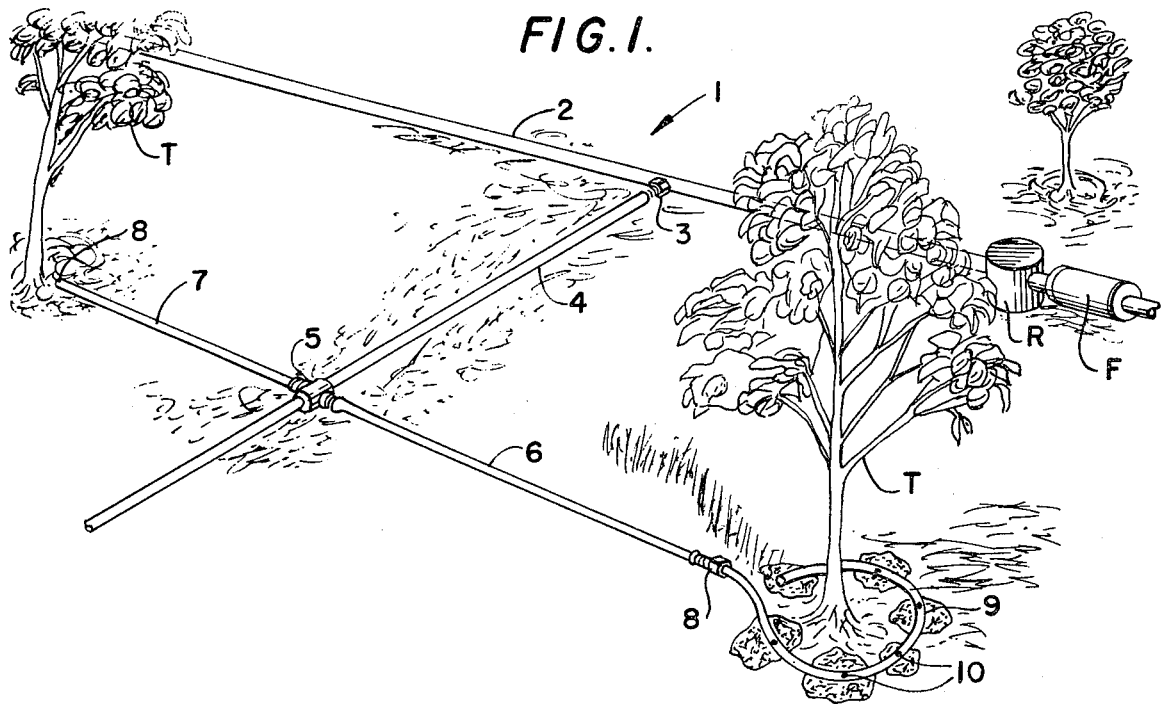
FIG. 1 is a top perspective view of a trickle type irrigation system according to the present invention and utilizing the fittings of the present invention.

Referring now more particularly to the drawings wherein like reference numerals indicate like parts throughout the several views, a trickle type irrigation system is indicated generally at 1 in FIG. 1 and comprises a relatively large main line 2 having a filter F and regulator R therein for filtering and regulating the flow of irrigating water therethrough.

A piercing fitting 3 is connected to the main line 2 and a first branch line 4 is connected to the piercing fitting 3 and thus to the main line 2. A cross-type fitting 5 is interposed in the branch line 4 and a pair of secondary branch lines 6 and 7 are joined thereto and extend in opposite directions therefrom. The secondary branch lines 6 and 7 extend at their ends to adjacent the root zones of crops to be irrigated, such as fruit trees T or the like, and an adjustable orifice fitting 8 is fixed to each of the branch lines 6 and 7 at their outer ends for restricting the rate of flow of irrigating water from the branch lines.

An optional, secondary distribution tube 9, with or without calibrated outlets 10, is attached to the adjustable orifice fitting 8 at the end of branch line 6 and extends around the tree T for further control of the water to the root zone of the tree. The distribution tube 9 could also be extended along a row of crops or the like, if desired.

Figure 2:
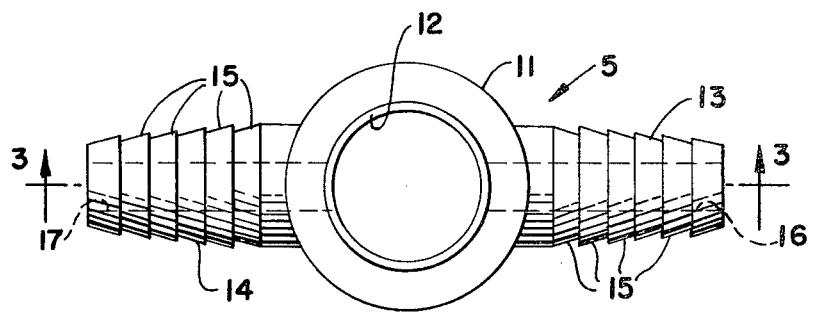
FIG. 2 is a top view of a fitting for joining together a relatively large main line and a plurality of smaller branch lines.
Figure 3:
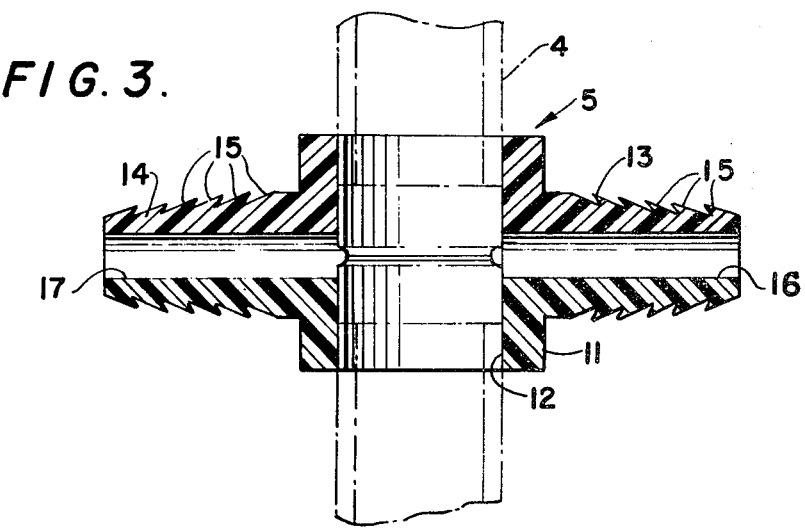
FIG. 3 is a view in section of the fitting of FIG. 2 and is taken along line 3—3.

In FIGS. 2 and 3, the construction of the cross-type fitting 5 can more clearly be seen. The cross-type fitting includes a cylindrical body 11 having a cylindrical bore 12 therethrough, in the opposite ends of which a branch line or main line or the like 4 is adapted to be received and secured in a conventional and well-known manner. A pair of tapered nipples 13 and 14 extend laterally from the cylindrical body 11 on diametrically opposite sides thereof and the nipples 13 and 14 have serrations 15 on the external tapered surface thereof.

The nipples 13 and 14 have longitudinal bores 16 and 17 therein, respectively, communicating at their inner ends with the bore 12 through the cylindrical part 11 of fitting 5. In a preferred embodiment, the bores 16 and 17 through the nipples 13 and 14 each have the same diameter and their diameter is less than the diameter of the bore 12.

By way of specific example, the outer surface of each of the nipples 13 and 14 is tapered approximately 10 degrees with respect to the longitudinal axis of the nipple and the serrations 15 are inclined approximately 20 degrees relative to the longitudinal axis of the nipples. The serrations 15 are approximately one-sixteenth of an inch long on a nipple having a diameter at the small end thereof on the order of 0.170 inches, and a length of approximately three-fourths of an inch. There are approximately eleven serrations or lands on each such nipple to allow for at least three different sizes of hose to be used on any one fitting, which reduces tooling costs and inventory costs on customer, dealer and manufacturer. This arrangement has been found to be best and is necessary for maximum sealing and gripping power. The fitting is preferably made of a synthetic plastic material by the extrusion molding method, although it could be made from a metallic or other suitable material as desired. Further, although a fitting having two nipples thereon is specifically illustrated and described, it is to be understood that one or any number of nipples 13 and 14 could be provided on the fitting if desired, and one end of the bore 12 could be closed if desired so that the fitting would comprise a T-fitting or the like, or one end could be reduced in size to continue on through a smaller supply line.

These forms of piercing fittings or connectors are shown in FIGS. 4, 5, 6 and 7, respectively.

In FIG. 4, a first form of piercing connector or fitting 18 is shown and comprises a frusto-conically shaped body 19 having serrations 20 on the outer surface thereof for gripping a plastic pipe or conduit C inserted over the end thereof. A projection 21 extends axially from one end of the body 19 and the extreme end of projection 21 is inwardly tapered as at 22 to define a piercing or penetrating end 23. The projection 21 has a reduced diameter in relation to the diameter at the base of the taper 22 to define a shoulder 24 which engages and locks behind the wall of conduit 2 when the end 21 is inserted through the wall of conduit 2. A bore 25 extends coaxially through the projection 21 and body 19 to establish communication between the bore 26 in the conduit 2 and the bore of conduit C when the fitting 18 is connected therebetween.

In FIG. 5, a second form of coupling or connector 27 is shown and comprises a female fitting 28 having a tapered body portion 19' with serrations 20' thereon. The other end of the female fitting 28 is diametrically enlarged and is internally threaded at 29 for adjustable threaded engagement with external threads 30 on a male fitting 31. The male fitting 31 has a projection 21' on the end thereof opposite the threaded end 30 with a tapered end 22' and defining a penetrating end 23' and a retaining shoulder 24' identical to the form of the invention illustrated and described with reference to FIG. 4. Longitudinal bores 32 and 33 are formed through the female fitting 28 and the male fitting 31, respectively, for conveying fluid from the bore 26 in conduit 2 to a conduit C.

A resilient compressible orifice member 34 is clamped about its peripheral edge portion between opposed, facing, concave, conical surfaces 35 and 36 on the female fitting and male fitting, respectively. A conically shaped orifice 37 is in the center of the compressible orifice member 34 for restricting and controlling the rate of flow through the connector 27. The female fitting 28 and the male fitting 31 may be threadably adjusted toward one another to compress the compressible orifice member 34 between the opposed facing conical surfaces 35 and 36, the taper of the conical surfaces causing the compressible member to be deformed radially inwardly to decrease the size of the orifice 37 therethrough and thus to further restrict the rate of flow through the connector 27.

In FIGS. 6 and 7, a fourth type of fitting is illustrated and comprises a neck or projection 21' with a tapered, enlarged head or end 22' having a penetrating end 23' and a retaining shoulder 24' for penetrating the wall of a conduit 2 as in the forms of the invention shown in FIGS. 4 and 5. The neck 21' terminates in the center of the flat side of a hollow semi-cylindrical body 38 having opposite open ends 39 and 40 and with its axis perpendicular to the axis of the neck 21'. An orifice 41 extends through the flat side of body 38 and through the projection 21 to establish fluid communication between the interior of conduit 2 and the open ends of body 38.

In FIGS. 8 and 9, a fifth form of the invention is shown and comprises a coupling or connector 42 for joining two pipes together in end-to-end relationship and comprises a female fitting 28' having a conically tapered end 19' with a plurality of serrations 20' thereon as in the previous embodiments of the invention. The other end of the female fitting 28' is diametrically enlarged and hollowed and is internally screw threaded at 29'.

A concave, conically shaped surface 35' is formed in the female fitting at the inner end of the threaded portion 29', and a longitudinal bore 32' extends through the female fitting from the conically shaped surface 35' through the other end of the female fitting.

A male fitting 43 is threadably engaged with the female fitting and comprises a conically tapered end 44 having serrations 20' thereon and a cylindrical portion 45 having screw threads 46 thereon for mating cooperation with the screw threads 29' in the female fitting. A longitudinal bore 47 extends through the male fitting and the screw threaded end thereof is conically recessed at 48.

A resilient compressible orifice member 34' having a conical orifice 37' therethrough is clamped about its peripheral edge between the conically recessed surfaces 35' and 48 and as shown in FIG. 8, the male and female fittings are in their normal positions with the compressible orifice member 34' snugly clamped at its peripheral edge between the opposed facing conical surfaces 35' and 48.

In FIG. 9, the male and female fittings are threadably adjusted toward one another and the surfaces 35' and 48 engage the compressible orifice member 34' and compress it radially inwardly to restrict the size of the conical orifice 37' therethrough.

The fittings and connectors described herein may be made of any suitable material, such as synthetic plastic or metal or the like; and by way of specific example, the conically tapered serrated ends of the fittings would have a taper of approximately 10° relative to the longitudinal axis thereof and the serrations would have an angle of inclination of approximately 20° with respect to the longitudinal axis of the fitting, the serration being approximately one-sixteenth of an inch long.

The conically shaped orifice through the compressible orifice member tends to prevent clogging of the orifice inasmuch as the orifice increases in diameter in a downstream direction and thus dirt and the like tends to be dislodged from the orifice rather than to become lodged therein as in prior art devices.

With the present invention, a trickle type irrigation system can be quickly and easily assembled without the use of skilled and expensive labor and without requiring the use of special tools and the like, it being necessary simply to push the fittings and pipes comprising the irrigation system together to effect a secure and leaktight connection therebetween.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A self-piercing, quick-connect irrigation fitting for trickle-type irrigation systems, comprising: a hollow, open-ended, semicylindrical, synthetic plastic body having a flat, planar side, the hollow interior of the body being semicylindrical and extending the length of the body; a projection on the center of said flat side of said body terminating in a sharpened free end; and tapered, enlarged piercing head on the free end of the projection defining an annular retaining shoulder facing away from the free end toward the body; the axis of the projection disposed perpendicular to the axis of the open-ended semicylindrical body; and a restricted passageway extending through the projection from the free end thereof to the hollow body, said hollow body thus defining a shrouded outlet against which water impinges as it passes from the restricted passageway when the fitting is attached to a water-containing conduit to effect flow of water from the open ends of the semicylindrical body to irrigate a localized area, said sharpened end adapted to penetrate the wall of a conduit whereby the shoulder engages behind the wall to retain the fitting in place.

* * * * *